United States Patent Office 2,930,795
Patented Mar. 29, 1960

2,930,795

2-(AMINOALKYL-HYDRAZINO)-METHYL-PYRROLIDINES

John H. Biel, Milwaukee, Wis., assignor to Lakeside Laboratories, Inc., Milwaukee, Wis., a corporation of Wisconsin No Drawing. Application August 26, 1957
Serial No. 680,424

12 Claims. (Cl. 260—313)

This invention relates to 2-aminomethylpyrrolidine, but is more particularly concerned with novel basically substituted derivatives thereof and processes of preparing the derivatives.

According to the present invention there are provided novel compounds of the formula

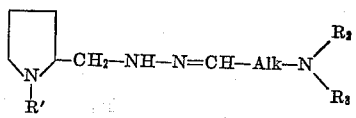

and

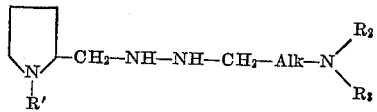

and novel intermediates and processes of preparing such compounds wherein R' is an alkyl group, particularly a lower alkyl such as methyl, ethyl, propyl, isopropyl, butyl, pentyl, hexyl and the like, an alkenyl group such as the allyl group, an aralkyl group, particularly those in which the aryl moiety is phenyl or naphthyl and the alkyl moiety is a lower alkyl, of which aralkyl groups benzyl and phenethyl are representative, an alkynyl group such as propargyl, or a disubstituted amino group such as dimethylamino, diphenylamino, and dibenzylamino; Alk represents a straight or branched alkylene group having 1-9 carbons; and $R^2$ and $R^3$ represent the same or different substituents of the group consisting of alkyl groups, particularly lower alkyl groups such as methyl, ethyl, propyl, isopropyl, butyl, pentyl, hexyl and the like, cycloalkyl groups and particularly the cyclopentyl and cyclohexyl groups, alkenyl groups such as the allyl group, aryl groups, particularly wherein the aryl group is phenyl or naphthyl and such groups with nuclear substituents including hydroxyphenyl and lower alkoxyphenyl, halophenyl and lower acyloxyphenyl groups such as chlorophenyl, methoxyphenyl and acetoxyphenyl groups, aralkyl groups, particularly those in which the alkyl moiety is a lower alkyl and the aryl moiety is as described above for the aryl groups but including the 2-furfurylalkyl group, and groups wherein $R^2$ and $R^3$ are joined to form heterocyclic groups such as the pyrrolidino, piperidino, morpholino, piperazino, N-lower alkyl-4-piperazino, N-halobenzyl-4-piperazino, N-p-loweralkoxy-benzyl-N-2-pyridylamino, N-phenyl-N-benzylamino, N-methyl-N-benzodioxanylmethylamino, N-2-thienyl-N-2-pyridylamino, N-o-halophenyl-4-piperazino, N-amino-4-piperazino, di-loweralkyl hydrazino, 7-theophyllino, 1,2,3,4-tetrahydroisoquinolino, 1,2,3,4-tetrahydroquinolino, isindolino, 4-methyl-1-piperazino, 3-hydroxypiperidino and 4-hydroxypiperidino; and acid addition and quaternary ammonium salts thereof.

Compounds of the formulae above are produced by reacting an N-substituted 3-piperidyl halide or 3-piperidyl p-toluene-sulfonate (I) with hydrazine to form an N-substituted-2-hydrazinomethylpyrrolidine (II) which is reacted with an N,N-disubstituted aminoalkyl aldehyde (III) to form an N-substituted-2-(N,N-disubstituted aminoalkylidenyl)-hydrazinomethylpyrrolidino (IV) this is subsequently reduced to the desired N-substituted-2-(N,N-disubstituted aminoalkyl)-hydrazinomethyl-pyrrolidine (V). This reaction may be represented as follows:

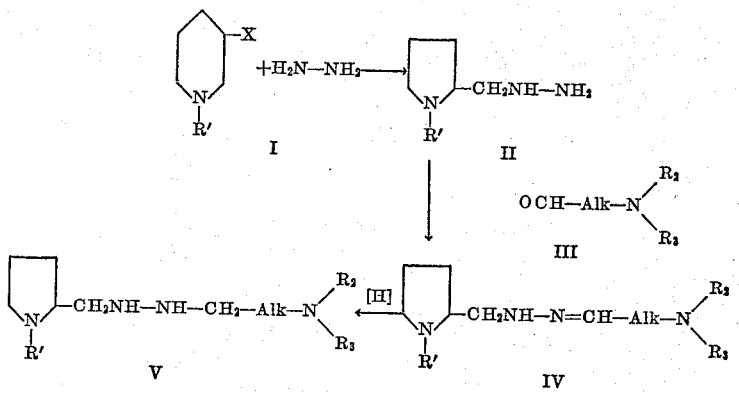

wherein X is bromine, chlorine, iodine or p-toluenesulfonate, and R', $R_2$, $R_3$ and Alk have the significance previously assigned.

Reaction between the N-substituted 3-piperidyl halide or 3-piperidyl p-toluenesulfonate and hydrazine is effected by contacting the reactants in the presence of water. Reaction occurs at room temperature although elevated temperatures such as the reflux temperature are advisably employed. At the higher temperatures about 1 to 5 hours are adequate to substantially complete the reaction. Recovery of the desired N-substituted-2-hydrazinomethylpyrrolidine from the reaction mixture is conveniently effected by conventional methods. Thus the products, generally oils as the free base, may be salted out with an alkali metal hydroxide and extracted with a water immiscible organic solvent such as ether. The product is isolated by distillation, generally under reduced pressure.

Typical of the N-substituted-3-piperidyl halides and 3-piperidyl p-toluenesulfonates which may be used in this process are N-methyl-3-chloropiperidine, N-butyl-3-bromopiperidine, N-allyl-3-chloropiperidine, N-propargyl-3-iodopiperidine, N-o-chlorobenzyl-3-piperidyl p-toluenesulfonate, N-dimethylamino-3-chloropiperidine, N-p-methoxyphenethyl-3-bromopiperidine, N-3,4-methylenedioxyphenylisopropyl-3-iodopiperidine and N-p-hydroxyphenethyl-3-bromopiperidine.

By following the described procedure compounds such as N-methyl-2-hydrazinomethylpyrrolidine, N-benzyl-2-hydrazinomethylpyrrolidine, N-phenethyl-2-hydrazinomethylpyrrolidine, N-allyl-2-hydrazinomethylpyrrolidine, N-propargyl-2-hydrazinomethylpyrrolidine, N-dimethylamino-2-hydrazinomethylpyrrolidine and N-dibenzylamino-2-hydrazinomethylpyrrolidine are produced.

Reaction between the N-substituted-2-hydrazinomethylpyrrolidine and N,N-disubstituted aminoalkyl aldehyde to produce an N-substituted-2-(N,N-disubstituted aminoalkylidenyl)-hydrazinomethylpyrrolidine is effected by contacting the reactants in the presence of water. Reaction proceeds at room temperature although slightly elevated temperatures hasten the reaction. At room temperature about 5 to 20 hours are adequate to bring about nearly complete reaction. Recovery of the product from the reaction mixture is achieved by salting out the product as with sodium hydroxide, extracting with an immiscible solvent such as ether or tetrahydrofuran and fractionally distilling the extract.

N,N-disubstituted aminoalkyl aldehydes such as dimethylaminoacetaldehyde, pyrrolidinoacetaldehyde, N-methyl-4-piperazinopropionaldehyde, 3-hydroxypiperidinoacetaldehyde, N-o-chlorobenzyl-N-methylaminobutyraldehyde, N-p-methoxybenzyl-N-2-pyridylaminoacetaldehyde, 2-(7-theophyllino)acetaldehyde, 7-(N,N-diallylamino)-heptaldehyde, phenothiazinoacetaldehyde, 8-(N-propargyl-N-methyl)-aminooctaldehyde, morpholinoacetaldehyde, 1,2,3,4-tetrahydroisoquinolinoacetaldehyde, isoindolino-acetaldehyde, diphenylaminopropionaldehyde, dibenzylaminobutyraldehyde, 5-(N-phenyl-N-ethylamino)-valeraldehyde and 8-morpholino-caprylaldehyde may be used in the described condensation reaction.

Some of the N-substituted-2-(N,N-disubstituted aminoalkylidenyl)-hydrazinomethylpyrrolidines or hydrazones which are produced according to the described reaction are N-(1-methyl-2-pyrrolidylmethyl)-N'-(β-dimethylaminoethylidenyl)-hydrazine, N-(1-benzyl-2-pyrrolidylmethyl)-N'-(1-methyl-4-piperazinopropylidenyl)-hydrazine, N-(1-allyl-2-pyrrolidylmethyl)-N'-(3-hydroxypiperidinoethylidenyl)-hydrazine, N-(1-propargyl-2-pyrrolidylmethyl)-N'-(N-o-chlorobenzyl-N-methylaminobutylidenyl)-hydrazine and related compounds corresponding to the reactants employed.

The hydrazones may be reduced to the corresponding N-substituted-2-(N,N-disubstituted aminoalkyl)-hydrazinomethylpyrrolidine by use of a suitable reducing agent. Lithium aluminum hydride is the preferred reducing agent although others may be used such as catalytic hydrogenation. With lithium aluminum hydride, the reduction may be conveniently effected by intimately combining the reactants in an inert organic solvent such as anhydrous ether, dioxane and tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent.

The organic phase and extracts then may be combined, dried, and the product distilled. Catalytic hydrogenation may be effected with platinum, palladium and oxides thereof as catalysts at atmospheric or elevated pressures. A weakly acidic medium may be used for reducing the hydrazones catalytically.

Hydrazines, such as those from the hydrazones named above and others, may be formed in this way.

Acid addition salts of the novel hydrazones and hydrazines are produced by contacting one mole of the hydrazine with one, two, three or four mole equivalents of a mineral or organic acid depending on the number of basic groups present. Acids such as hydrochloric, sulfuric, formic, citric and maleic may be used to form salts.

Quaternary ammonium salts of the hydrazones and hydrazines are readily produced by contacting the hydrazones and hydrazines with a suitable alkylating agent in the presence of an inert organic solvent. Examples of alkylating agents which may be used are dimethyl sulfate, methyl chloride, ethyl bromide, methyl iodide, o-chlorobenzyl bromide, phenethyl chloride and phenylpropyl bromide.

The non-toxic acid addition salts of the hydrazines possess diuretic properties while the quaternary ammonium salts possess hypotensive or blood-pressure lowering properties. For such uses, the salts are employed in conventional pharmaceutical forms including tablets, capsules, powders and solutions, preferably formulated into unit-dosage forms.

The following examples are presented to show methods of producing certain of the novel compounds included within this invention. It is to be understood, however, that these examples are only for purposes of illustration, and that the invention is not to be restricted to the embodiments specifically disclosed therein.

EXAMPLE 1

*N-methyl-2-hydrazinomethylpyrrolidine*

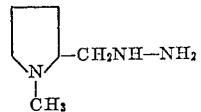

A mixture containing 38 g. (0.65 mole) of 54.5% aqueous hydrazine and 26.7 g. (0.20 mole) of N-methyl-3-chloropiperidine was refluxed for three hours. The reaction mixture was saturated with sodium hydroxide and extracted repeatedly with tetrahydrofuran. The combined extracts were dried with potassium carbonate and the product collected by distillation; B.P. 78–79° C. (2.5 mm.); yield 17.5 g. (68%); $N_D^{25}$ 1.4870.

*Analysis.*—Calcd. for $C_6H_{15}N_3$: N, 21.68. Found: N, 21.08.

EXAMPLE 2

*N-(1-methyl-2-pyrrolidylmethyl)-N'-(β-dimethylaminoethylidenyl)-hydrazine*

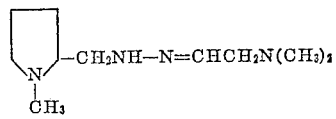

To an aqueous solution of 0.20 mole of dimethylaminoacetaldehyde hydrochloride (obtained from the acid hydrolysis of the corresponding diethyl acetal) was added 25.6 g. (0.20 mole) of 1-methyl-2-pyrrolidylmethyl hydrazine (Example 1). The solution was allowed to stand at room temperature for 16 hours, saturated with solid sodium hydroxide and extracted repeatedly with tetrahydrofuran. The combined extracts were dried with potassium carbonate and the product isolated by fractional distillation; B.P. 72–77° C. (0.03 mm.); yield 31 g. (79%).

*Analysis.*—Calcd. for $C_{10}H_{22}N_4$: N (titratable), 14.12. Found: N (titratable), 14.01.

EXAMPLE 3

*N-(1-methyl-2-pyrrolidylmethyl)-N'-(β-dimethylaminoethyl)-hydrazine*

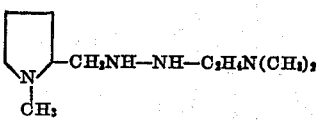

To 5.7 g. (0.15 mole) of lithium aluminum hydride in 100 cc. of tetrahydrofuran was added 29.8 g. (0.15 mole) of the ethylidene compound from Example 2 in 100 cc. of tetrahydrofuran. The mixture was stirred and refluxed for 4 hours, the complex decomposed with water, 40% aqueous potassium hydroxide added and the product collected by fractional distillation; B.P. 80° C. (0.03 mm.); yield 26.7 g. (89%); $N_D^{25}$ 1.4794.

The tetramaleate salt was formed in ethyl alcohol and recrystallized from ethyl alcohol, M.P. 103–104° C.

*Analysis.*—Calcd. for $C_{26}H_{40}N_4O_{16}$: N(titratable), 6.33. Found: N(titratable), 6.29.

Neutral equivalent: 83.07. Found: N.E. 81.69.

Various changes and modifications of the invention can be made and, to the extent that such variations incorporate the spirit of this invention, they are intended to be included within the scope of the appended claims.

What is claimed is:

1. Compounds of the group consisting of compounds of the formulae:

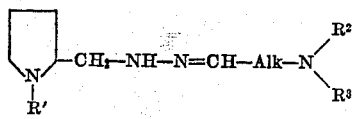

and

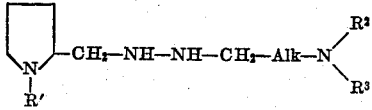

and nontoxic acid addition salts, lower alkyl quaternary ammonium salts and phenyl-lower alkyl quaternary ammonium salts thereof, wherein R' is a member of the groups consisting of lower alkyl, lower alkenyl, lower alkynyl, phenyl-lower alkyl, R² and R³ are members of the group consisting of lower alkyl, cyclohexyl, cyclopentyl, lower alkenyl, lower alkynyl, phenyl and phenyl-lower alkyl groups and heterocyclic groups formed by joining R² and R³ to form a ring with the nitrogen in the ring of the group consisting of pyrrolidino, piperidino, morpholino, piperazino, N-lower alkyl-4-piperazino, N-halobenzyl-4-piperazino, N-o-halophenyl-4-piperazino, N-amino-4-piperazino 7-theophyllino, 1,2,3,4-tetrahydroisoquinolino, 1,2,3,4-tetrahydroquinolino, isoindolino, 3-hydroxypiperidino and 4-hydroxypiperidino groups, and Alk is an alkylene group of 1–9 carbons.

2. N-(1-lower alkyl-2-pyrrolidylmethyl)-N'-(ω-di-lower alkyl aminoalkylidenyl)-hydrazine wherein the alkylidenyl group is a lower alkylidenyl group of more than 1 carbon and not more than 10 carbons.

3. N-(1-methyl-2-pyrrolidylmethyl)-N'-(β-dimethylaminoethylidenyl)-hydrazine.

4. N-(1-lower alkyl-2-pyrrolidylmethyl)-N'-(ω-di-lower alkyl aminoalkylene)-hydrazine in which the alkylene group on the N' nitrogen is a lower alkylene group of more than 1 carbon and not more than 10 carbons.

5. N-(1-methyl-2-pyrrolidylmethyl)-N'-(β-dimethylaminoethyl)-hydrazine.

6. The process which comprises reacting a compound of the formula

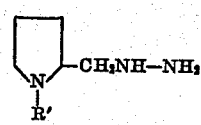

with hydrazine to produce compounds of the formula

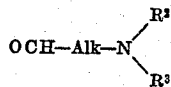

reacting this compound with compounds of the formula

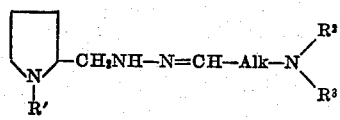

to produce hydrazones of the formula

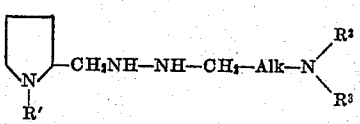

and reducing the hydrazones to hydrazines of the formula

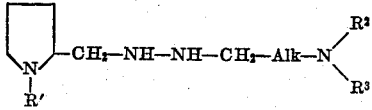

wherein X is a member of the group consisting of bromine, chlorine, iodine and p-toluenesulfonate, R' is a member of the groups consisting of lower alkyl, lower alkenyl, lower alkynyl, and phenyl-lower alkyl groups, R² and R³ are members of the group consisting of lower alkyl, cyclohexyl and cyclopentyl, lower alkenyl, lower alkynyl, phenyl and phenyl-lower alkyl groups and heterocyclic groups formed by joining R² and R³ to form a ring with the nitrogen in the ring of the group consisting of the pyrrolidino, piperidino, morpholino, piperazino, N-lower alkyl-4-piperazino, N-halobenzyl-4-piperazino, N-o-halophenyl-4-piperazino, N-amino-4-piperazino, 7-theophyllino, 1,2,3,4-tetrahydroisoquinolino, 1,2,3,4-tetrahydroquinolino, isoindolino, 3-hydroxypiperidino and 4-hydroxypiperidino, and Alk is an alkylene group of 1–9 carbons.

7. A compound of the formula:

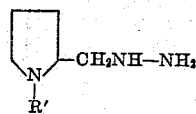

wherein R' is lower alkyl.

8. A compound of the formula:

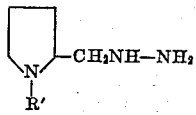

wherein R' is lower alkenyl.

9. A compound of the formula:

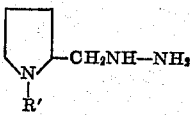

wherein R' is lower alkynyl.

10. A compound of the formula:

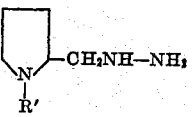

wherein R' is phenyl-lower alkyl.

11. N-lower alkyl-2-hydrazinomethylpyrrolidine.

12. N-methyl-2-hydrazinomethylpyrrolidine.

No references cited.

UNITED STATES PATENT OFFICE

Certificate of Correction

March 29, 1960

Patent No. 2,930,795

John H. Biel

It is hereby certified that error appears in the printed specification of the above numbered patent requiring correction and that the said Letters Patent should read as corrected below.

Column 2, line 21, for "isindolino" read —isoindolino—; column 5, line 44, for "groups" read —group—; lines 71 to 75, the formula should appear as shown below instead of as in the patent:

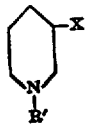

Signed and sealed this 11th day of April 1961.

[SEAL]

Attest:
ERNEST W. SWIDER,
*Attesting Officer.*

ARTHUR W. CROCKER,
*Acting Commissioner of Patents.*